United States Patent [19]

Bricaud et al.

[11] Patent Number: 5,703,346

[45] Date of Patent: Dec. 30, 1997

[54] CARD RECEIVER CASE

[75] Inventors: Hervé Guy Bricaud; Fabrice Valcher, both of Dole, France

[73] Assignee: ITT Corporation, New York, N.Y.

[21] Appl. No.: 612,572

[22] Filed: Mar. 8, 1996

[30]     Foreign Application Priority Data

Jul. 18, 1994 [FR] France ............................ 94 08842
Jul. 18, 1995 [WO] WIPO .................. PCT/FR95/00958

[51] Int. Cl.⁶ ............................................... G06K 7/00
[52] U.S. Cl. ................................... 235/44.1; 235/486
[58] Field of Search ................................ 235/441, 486

[56]            References Cited

U.S. PATENT DOCUMENTS 5,276,317  1/1994  Ozouf ............................ 235/486
5,402,095  3/1995  Janniere ......................... 235/441

FOREIGN PATENT DOCUMENTS 0366513  5/1990  European Pat. Off. .
3840663  6/1990  Germany .
4218970  12/1993  Germany .

*Primary Examiner*—Harold Pitts
*Attorney, Agent, or Firm*—Freilich Hornbaker Rosen

[57]             ABSTRACT

A case is provided for receiving an electronic card (C), which includes a one-piece molded housing (10) that forms a pair of slideways (12, 14) that guide opposite side portions of the card and that includes upper and lower crosspieces (46, 20) that connect the slideways and that are vertically spaced. A separate electrical connector (60) is provided which includes a connector frame (61) and a plurality of electrical contacts (77) mounted on the frame, with each contact having an upwardly-projecting contact blade (63). The connector is mounted on the lower crosspiece of the housing, with the contact blades projecting through card-receiving slots (64) of the housing. The card receiver can have a butterfly shape, with each crosspiece having a middle section (36) of small length, and each crosspiece can be formed with large apertures (24, 28A, 28B), which reduce weight and cost. The upper crosspiece has a brake tab extending at a forward-downward incline, with a forward end lying near the front end of the card-receiving slot to provide tactile feedback indicating when the card is closely approaching full insertion.

18 Claims, 14 Drawing Sheets

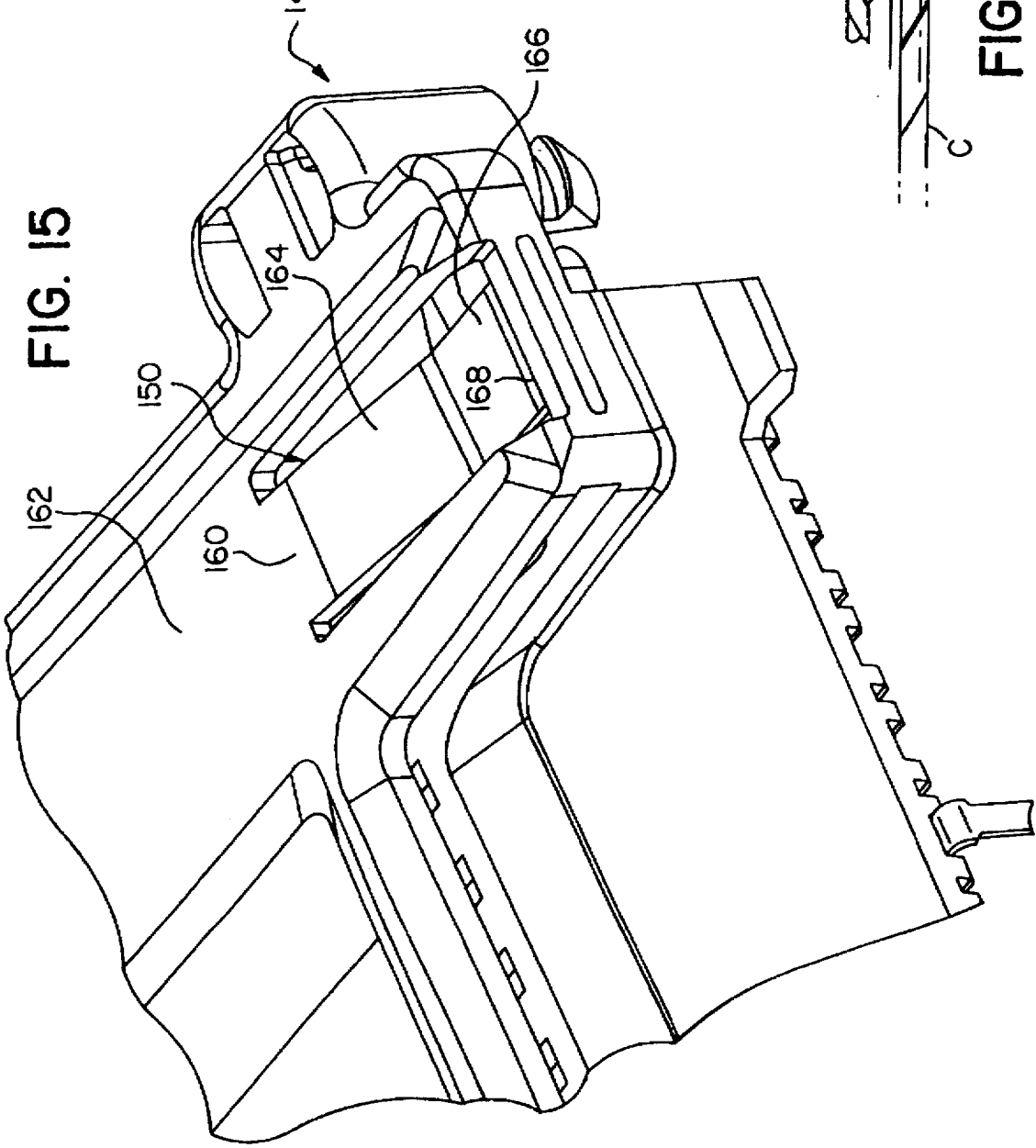

CARD RECEIVER CASE

BACKGROUND OF THE INVENTION

There is increasing use of thin cards, of the same or smaller width and length as common credit cards, with terminals on a card face, especially to provide access to restricted equipment, services, or areas. For example, a card unique to a person's automobile radio can be carried by that person to provide access to the radio, to discourage theft of the radio. Such cards are becoming available in a variety of sizes.

A card case for receiving the card, requires walls forming a slot for closely guiding a card during its forward insertion, and electrical contacts for engaging the card terminals when the card is fully inserted. Other functions of such a case are a sensor for generating a signal upon full card insertion and a brake for retaining the card so it does not accidentally pull out. One approach to a card case, described in European patent publication EP-A-0,316,699 includes upper and lower molded case halves that can be fixed together to form a slot between them. During manufacture of the lower case half, electrical contacts are molded into the lower case half. This approach has the disadvantage that separate contacts must be constructed and separate upper and lower molds must be formed for the upper and lower cases for each size or shape card. An approach to the design of card cases which minimized the cost for tooling up to manufacture different size cases for different cards, and which provided reliable contacts and reliable full-insertion detectors, would be of value.

SUMMARY OF THE INVENTION

In accordance with one embodiment of the present invention, card cases are provided for receiving and contacting terminals of electronic cards, which minimizes tooling costs for a case designed to receive a card of predetermined size. A housing that is custom tooled for a particular card size, includes a pair of laterally spaced slideways for guiding opposite sides of the card, and upper and lower plate-like crosspieces that connect the slideways and that form a card-receiving slot between them. A separate connector includes a connector frame and a plurality of contacts mounted on the frame, with the contacts having upwardly projecting contact blades. The connector is mounted on the lower crosspiece of the housing, with the contact blades projecting up into the card-receiving slot to engage the terminals of a fully inserted card. The housing and the tooling for it can be formed at moderate cost, because contacts do not have to be molded into the housing, and because the simplicity permits the housing to be formed as a single unitary part.

The housing can be formed in a "butterfly" shape, with opposite side sections as long as each slideway, and with a center section of much smaller length that is about equal to the length of the small connector. This permits short contact tails at the front and rear of the small connector to be directly accessible for soldering to a circuit board on which the housing is mounted. This also saves material. Saving of material can be achieved by forming large apertures in one of the crosspieces in the left and right side sections thereof.

One of the crosspieces such as the upper one, can be formed with a brake tab. The brake tab extends at a downward incline, with the front of the tab lying near the front of the slot to engage the front portion of a card only as it is close to full insertion. This provides tactile feedback to the person inserting the card, to inform him that the card is nearly fully inserted.

The novel features of the invention are set forth with particularity in the appended claims. The invention will be best understood from the following description when read in conjunction with the accompanying drawings.

BRIEF DESCRIPTION OF THE DRAWINGS

FIG. 1A is an isometric view of a card-receiving case, with most of the upper crosspiece cut away, showing the case mounted on a circuit board and showing the front portion of an electronic card prior to insertion into the case.

FIG. 1B is a sectional view taken on line 1B—1B of FIG. 1A.

FIG. 1C is a sectional view of another embodiment of the invention, of the region shown in FIG. 1B.

FIG. 15 is an enlarged view of a portion of the case of FIG. 12.

FIG. 16 is a sectional view of the portion of the case of FIG. 15, showing a card as it begins to meet large resistance to full insertion.

FIG. 17 is a graph showing resistance to card displacement near the end of the card insertion.

DESCRIPTION OF THE PREFERRED EMBODIMENTS

Figure 1:
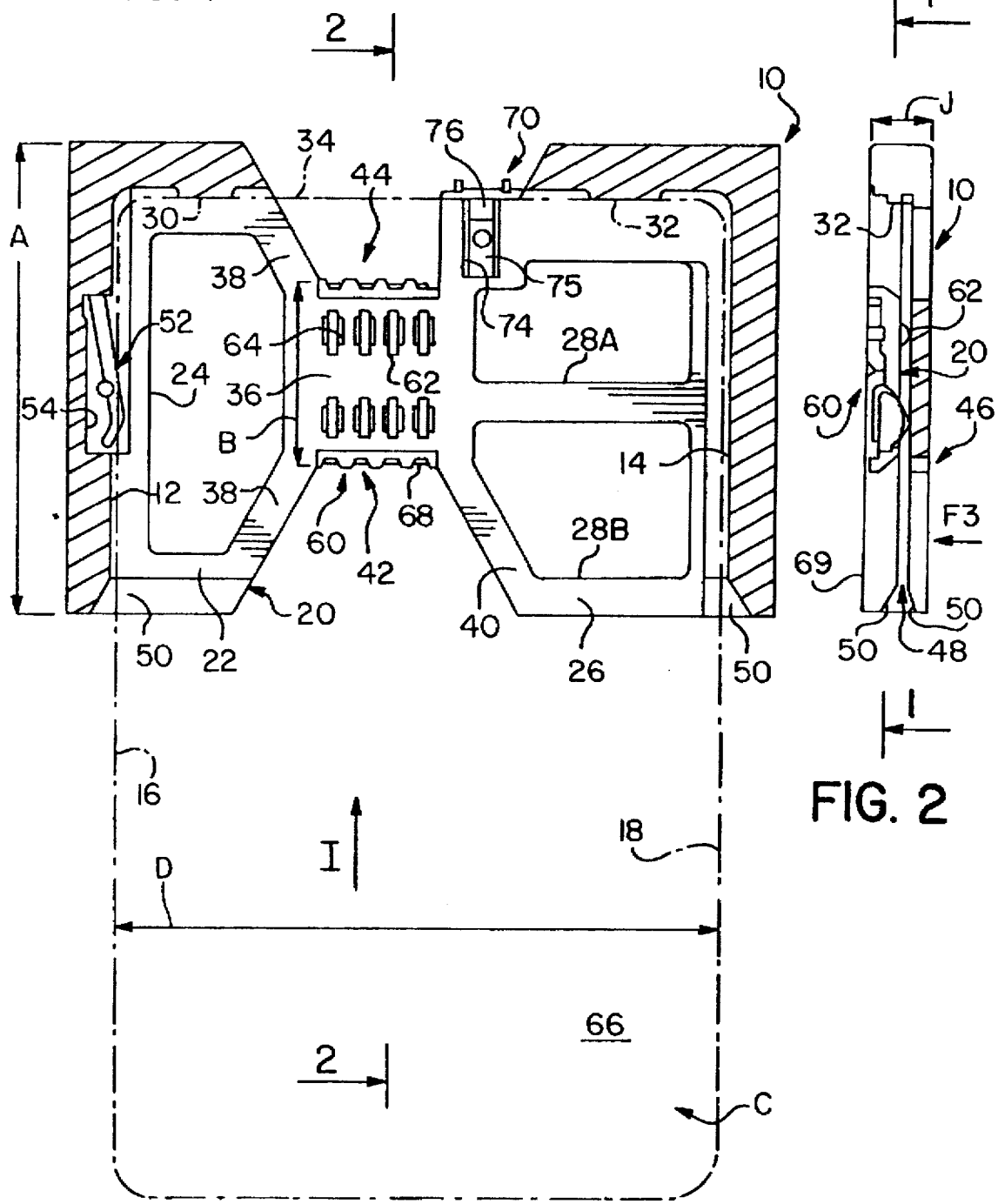
FIG. 1 is a sectional top view of the case of FIG. 1A, with a card shown in phantom lines, FIG. 1 being a view taken on line 1—1 of FIG. 2.
Figure 2:
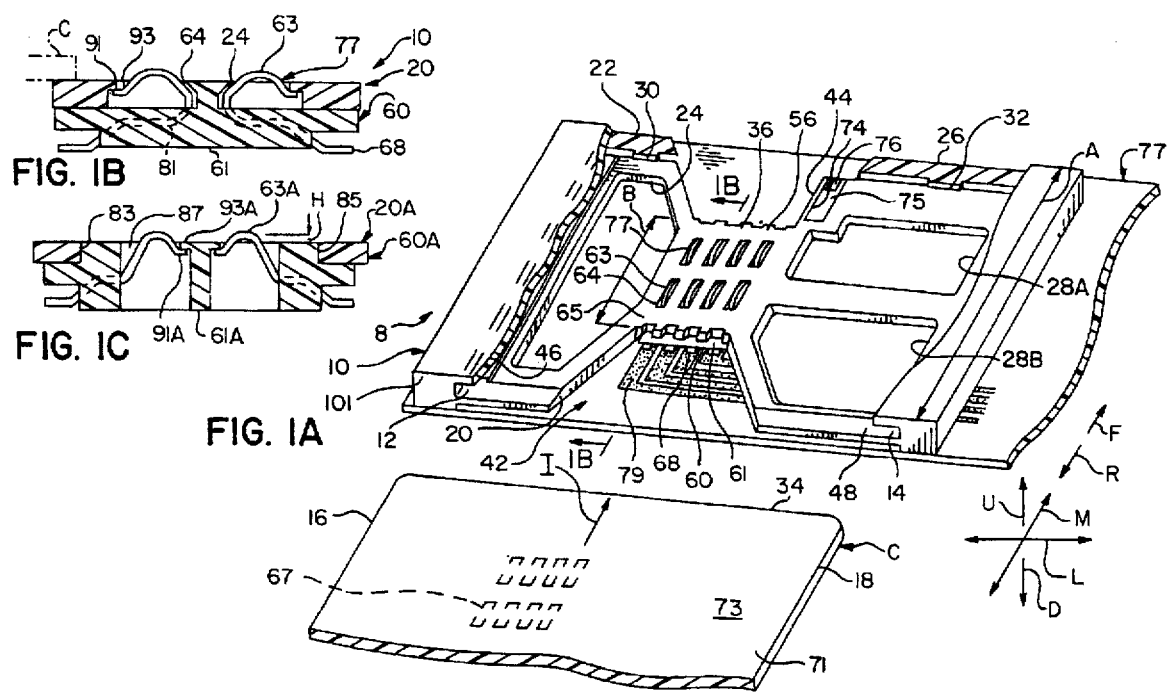
FIG. 2 is a view taken on line 2—2 of FIG. 1.

FIG. 1A illustrates a card-receiving case 8 which includes a receiver housing 10. The housing has a pair of laterally (in direction L) spaced slideways 12, 14 that slidably guide opposite sides of an electronic card C in movement in longitudinal directions M, including a forward direction F into the housing and in a rearward direction R out of the housing. The housing also includes lower and upper plate-like crosspiece members, or crosspieces 20, 46 that connect the two slideways together. The crosspieces are vertically spaced apart to form a card-receiving slot 48 between them. The card is sometimes referred to as an electronic card, a microprocessor card, or memory card to indicate that there is internal circuitry in the card.

The case 8 also includes a connector 60 which has a connector frame 61 that holds a plurality of contacts 77. The connector contacts have contact blades 63 that project upwardly (in direction U) from an upper surface 65 of the lower crosspiece. The contact blades 63 are intended to engage card terminals 67 lying on a lower face 71 of the card C, the lower face being opposite to an upper face 73. The card has opposite edge portions or sides 16, 18 that are closely guided by the slideways 12, 14 during insertion of the card in the forward or insertion direction I.

When the card is fully inserted, a forward edge 34 of the card abuts a pair of stops 30, 32 on the housing that stop the card. A switch actuator 75 detects when the card has been fully installed. The case 8 is mounted in an electronic device such as a radio, as by mounting the case on a circuit board 77. The circuit board has traces with pads 79 on its upper surface, and the contacts of the connector 60 have surface mount tails that engage and that are soldered to the traces. Of course, it is also possible to use contact tails that extend downwardly, in direction D, to project into plated board holes.

In the prior art, a case similar to case 8 was formed with separately molded upper and lower halves, each forming part of the slideway 12, 14. Electrical contacts were molded in place in the lower case half. Different card sizes are used, although there is a common arrangement of card terminals 67 (although some cards have more or less terminals). For each different card sizes, a different housing 10 must be provided. Previously, this required expensive tooling for each card size, especially for the lower half of the previous housing in order to mold in the contacts.

In accordance with the present invention, applicant minimizes the cost for constructing the case by using one or a limited number of standard connectors 64 with all sizes of cases 8, with only the housing 10 being unique for each card size or configuration. As shown in FIG. 1B, the connector 60 includes a plurality of contacts 77 that each has a mount portion 81 fixed to the connector frame 61, as by molding the mount portion in place. The connector frame 61 is mounted against the lower surface of the lower crosspiece 20 of the housing 10. As a result, the housing 10 is not initially formed with molded-in multiple contacts, or otherwise have to be formed to hold multiple contacts. As a result, the entire housing 10 including the opposite slideways 12, 14 and lower and upper crosspieces 20, 46 can be molded as a unitary, or one-piece part in a single mold cavity. The ability to mold the housing as a single unitary part, has the advantage of lower molding cost (twice as many complete housings can be formed in a mold of given size) and more accurate fabrication because two halves do not have to be fitted together. Tooling costs for each housing configuration are reduced because contacts do not have to be molded in, and contacts do not have to be specially formed for that housing. The connector 60 can be constructed at low cost because it is manufactured in large quantities as one or two "standard" assemblies. Applicant's U.S. patent application Ser. No. 08/588,536 filed Jan. 18, 1996 describes some of such connectors.

In FIGS. 1A and 1B, the lower crosspiece 20 is formed with a plurality of blade-passing vertical slots 64. The connector frame 61 is mounted under the crosspiece 20, with the contact blades 63 projecting upwardly through and above the slots 64 in the crosspiece. FIG. 1C shows an alternate construction, wherein the crosspiece 20A has a large frame-receiving aperture 83. The connector frame 61A has an upper portion 85 that lies in the frame-receiving aperture 83 in the crosspiece. The connector frame upper portion has a plurality of blade-passing slots 87, with each contact blade 63A projecting through and above one of the slots. The approaches of FIGS. 1B and 1C both provide simple mounting of the connector with its contacts, on the housing.

It may be noted that in FIG. 1C, each contact blade has a free end 91A which lies under a thin blade-location wall 93A formed in the connector frame 60A. The thin wall 93A helps to closely control the height H by which the blades project above the connector. In FIG. 1B, the crosspiece 20 is formed with thin walls 93 under which lie the blade free ends 91, to closely fix the height by which the blades project above the crosspiece upper surface.

It can be seen in FIG. 1A that the lower crosspiece 20 has left side and right side sections 22, 26 that each are about as long (in the longitudinal direction M) as the slideways 12, 14. However, the lower crosspiece has a middle or central section 36 with a longitudinal length that is no more than half as great as the length A of the opposite sides of the housing that includes the slideways. Also, it is noted that the connector 60 is mounted on the short length central section 36. An important reason for the small length B of the central section is that this provides direct access to the contact tails 68 for soldering them to the circuit board traces. The connector 60 has a small longitudinal length, because that is all that is required to mount the pattern of contact blades. Also, this allows the short connector to lie in housings of a wide range of lengths. Where surface mount contact tails 68 are provided, it is usually desirable if direct access can be obtained to each contact tail, so that heat can be directly applied (as by a soldering iron or infrared beam) to each tail, and so each solder joint can be easily visually inspected. Another advantage of the small length B of the central section 36, is that this leaves the contact tails 68 spaced from the rearward end 101 of the housing. As a result, if equipment containing the case allows the fingers of a person to reach the rear end 101 of the housing, static electricity is less likely to reach the tails 68 because they are spaced from the rear end. In addition to this, the smaller length B of the central section reduces the amount of plastic material used in molding each housing 10.

A further reduction in the amount of plastic material used in molding each housing, is achieved by forming windows 24, 28A, and 28B in the left and right side sections 22, 26. The reduction in material reduces cost, and the reduction in weight is advantageous where the apparatus that includes the case is a lightweight portable device. The housing is strengthened by mounting to the circuit board.

Figure 3:
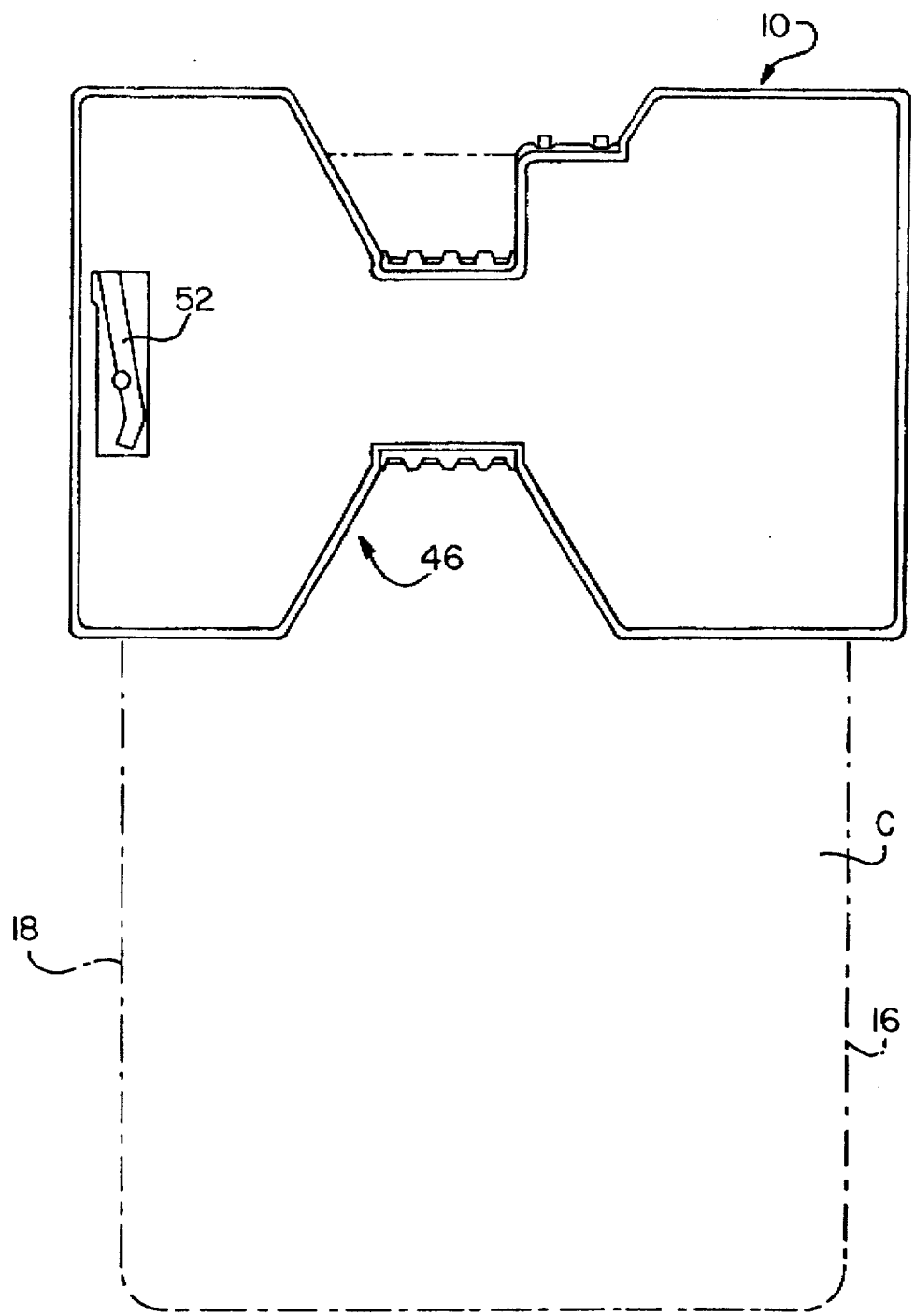
FIG. 3 is a plan view of the case of FIG. 1, and is a view taken in the direction of arrow F3 of FIG. 2.

As shown in FIG. 1, the lower crosspiece holds a card brake 52 in a recess 54 in the left slideway, to prevent loss of a fully inserted card. The left section has a pair of inclined arms 38, while the right section has a pair of arms 40, 72, resulting in a largely "butterfly" shape. It may be noted that a switch 75 lies in a slot 74 formed in the arm 72, and that the switch is mounted on the housing in a manner similar to that for the connector 60. The butterfly shape forms a pair of recesses 42, 44 at the rear and front of the housing, to leave the short length central section 36. The front of the card-receiving slot 48 includes chamfers 50 at its rear end. FIG. 3 shows that the top of the housing 10 does not have apertures in it.

In a case of the construction shown in FIGS. 1A and 1, the card had a width D of about 50 mm and the housing 10 had a width of about 56 mm. The housing had a length A of about 37 mm and a thickness J of about 5 mm. The central section 36 had a length B of about 14 mm, so the overall housing length A was at least twice as great as the length B of the central section. The central section was recessed a distance K of about 12 mm from the rear end 101 of the housing. Each of the recesses had dimensions relative to the other dimensions mentioned above, as illustrated in FIG. 1. The area occupied by the apertures is more than 10% of the area (without apertures) within the periphery of the lower crosspiece.

Figure 4:
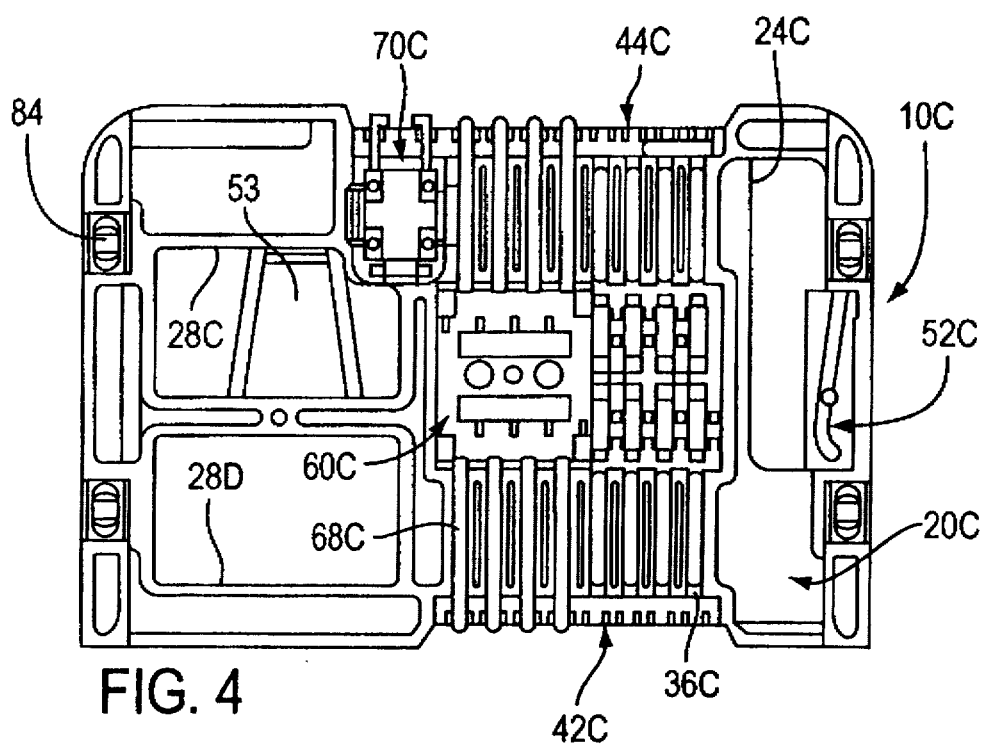
FIG. 4 is a bottom view of a case constructed in accordance with another embodiment of the invention.
Figure 5:
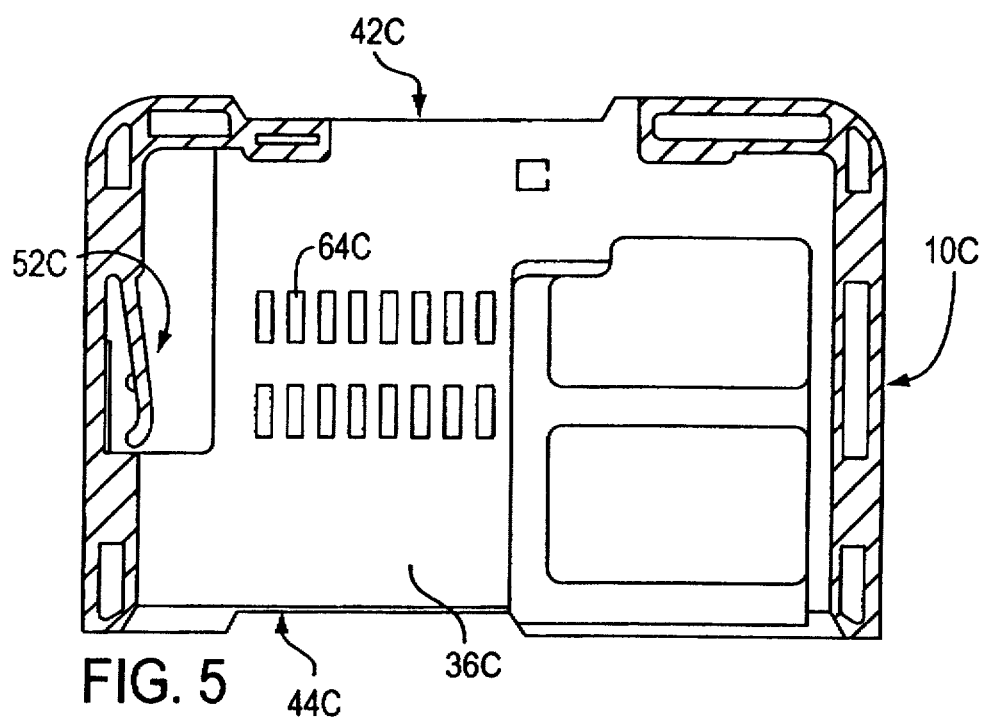
FIG. 5 is a sectional top view of the case of FIG. 4.
Figure 6:
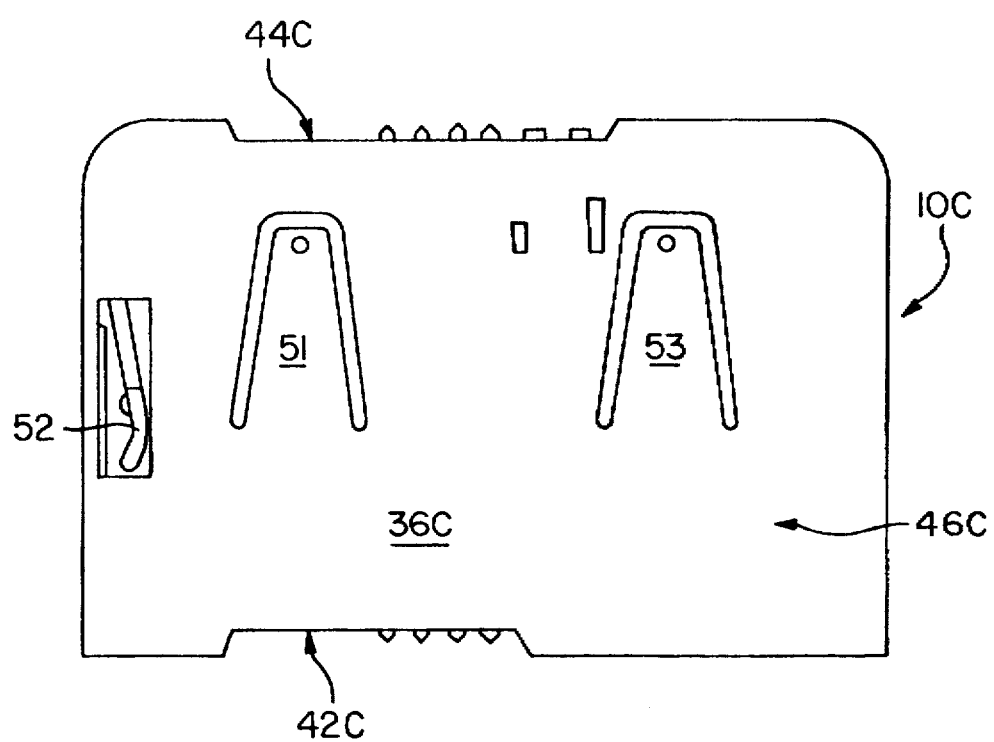
FIG. 6 is a plan view of the case of FIG. 5.
Figure 7:
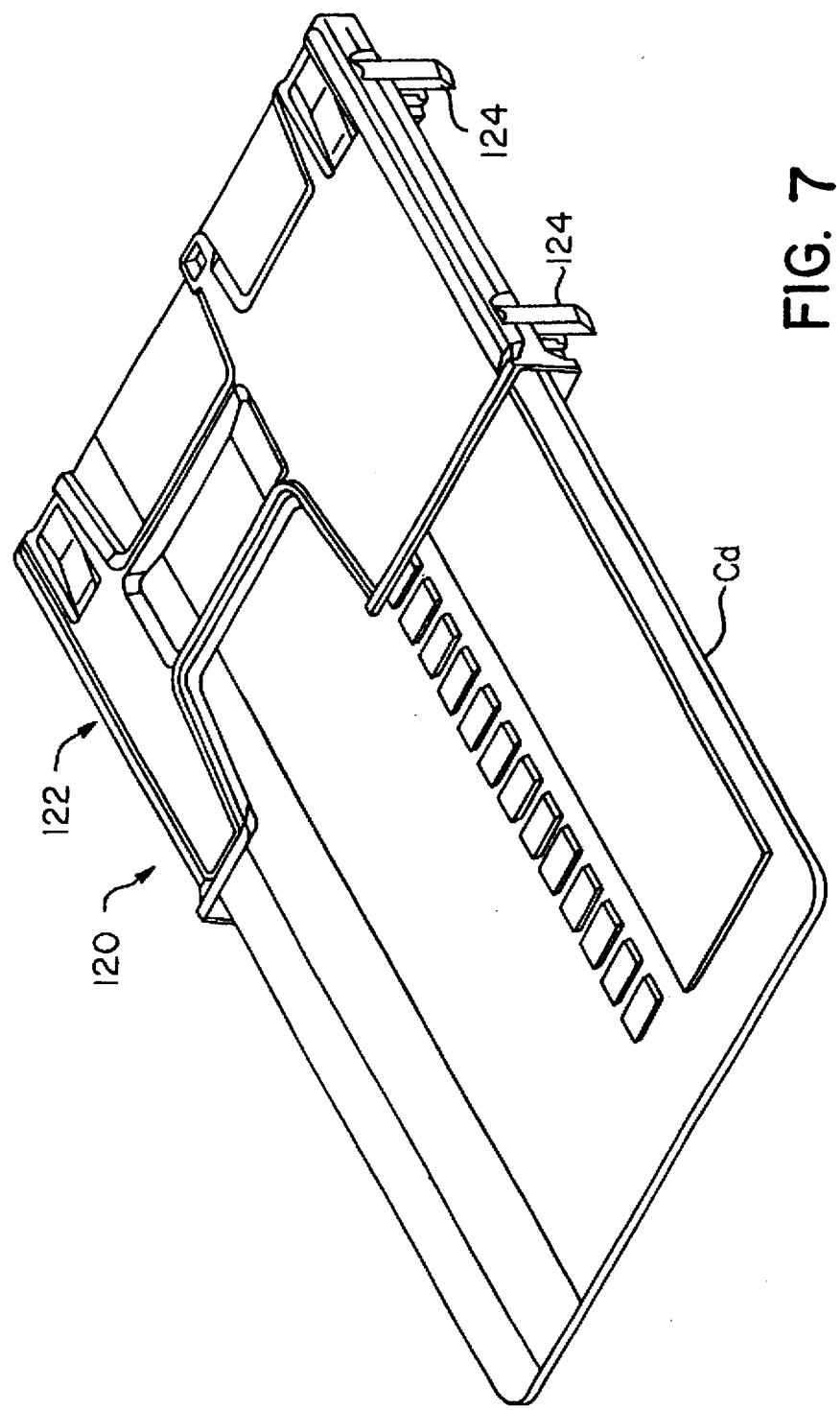
FIG. 7 is an isometric view of a case of another embodiment of the invention, with a card inserted therein, of still another embodiment of the invention.
Figure 8:
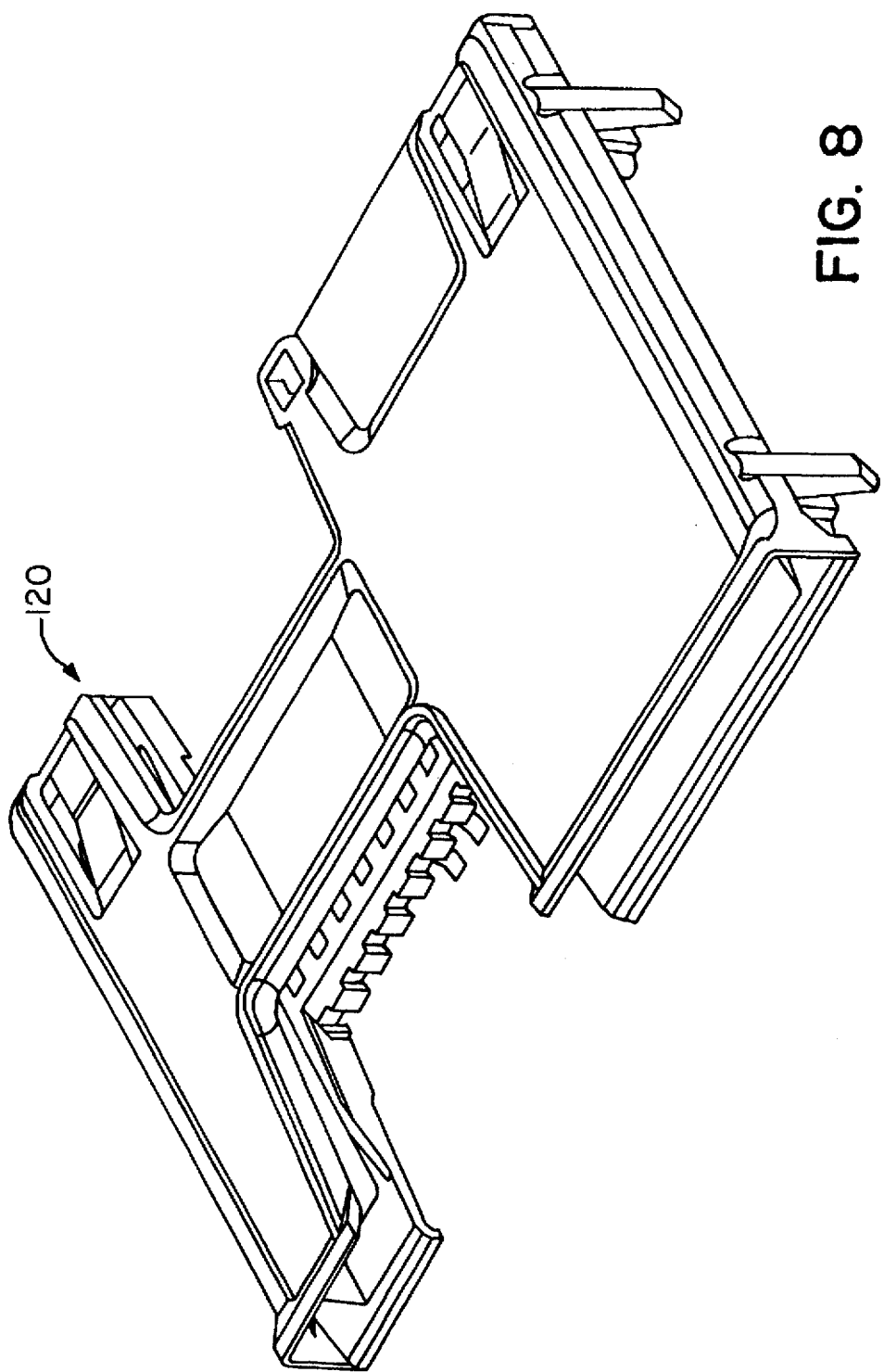
FIG. 8 is an isometric view of only the case of FIG. 7.
Figure 9:
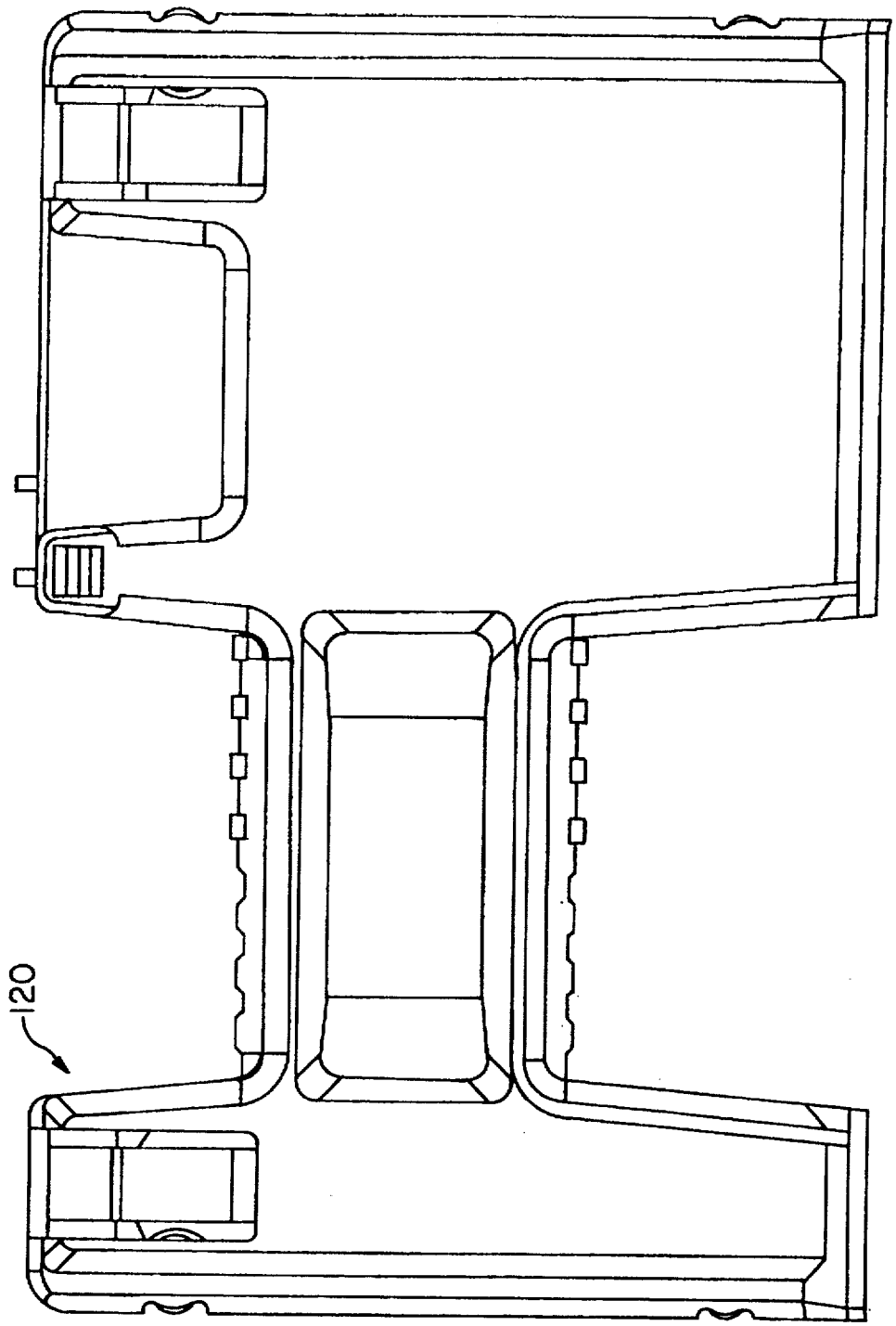
FIG. 9 is a plan view of the case of FIG. 7.

FIGS. 4–6 illustrate another case with a housing 10C of largely rectangular shape. The housing has a larger number of contact blade-receiving slots 64C to engage corresponding card terminals. FIG. 4 shows a connector 60C that is substantially identical to the connector 60 shown in FIG. 1 mounted at the bottom of the housing 10C. Another similar connector can be mounted beside the connector 60C to provide a total of 16 contacts instead of only the 8 contacts of the connector 60. An advantage of the housing 10C is that its upper and lower crosspieces provide greater strength. It may be noted in FIG. 6, that the housing 10C is provided with a pair of supplemental brakes 51, 53 which engage a card only as it closely approaches a full insertion position. FIG. 6 shows that the rear and front ends of the housing have short-length recesses 42C, 44C where the tails of the contacts lie. The contact tails 68C (FIG. 4) are elongated in order to reach the recesses. FIG. 4 shows feet 84, a switch 70C, holes 24C, 28C, 28D in a lower crosspiece 20C, a side brake 52C, and a long center section 36C.

Figure 10:
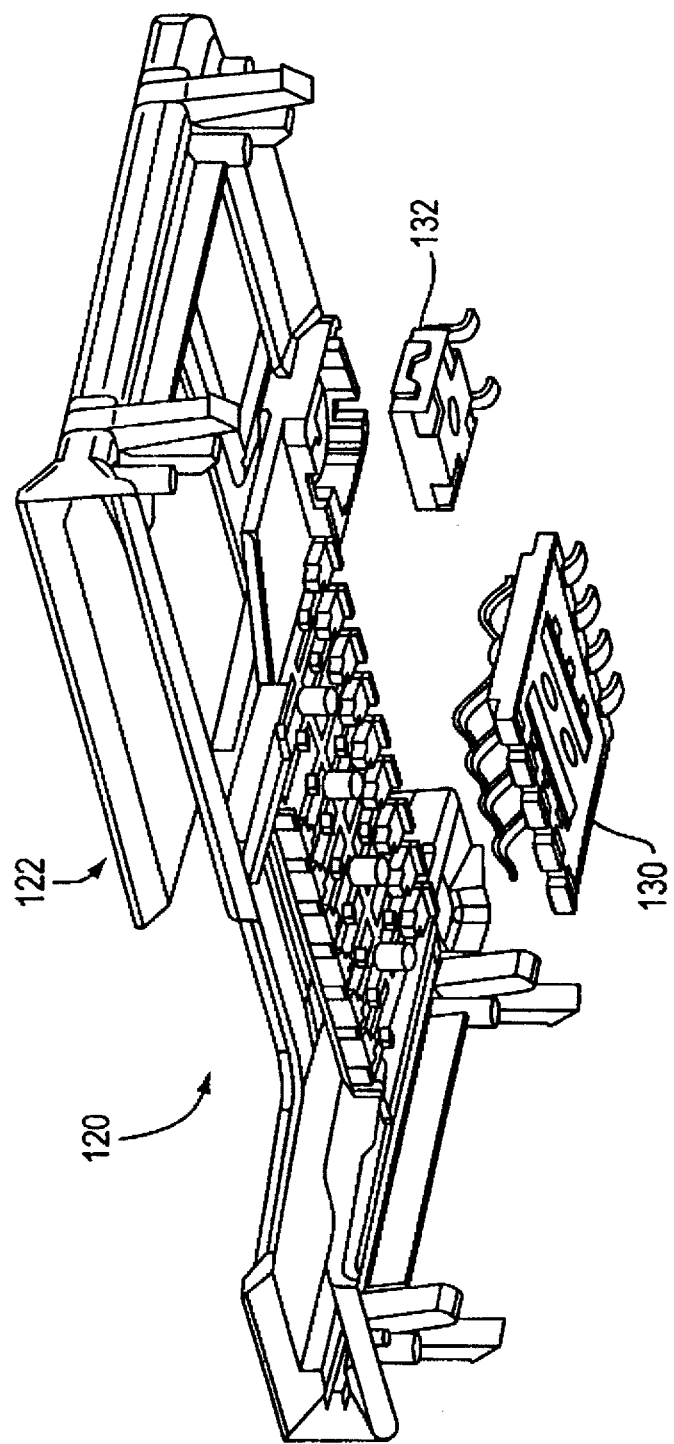
FIG. 10 is an exploded bottom isometric view of the case of FIG. 7.
Figure 11:
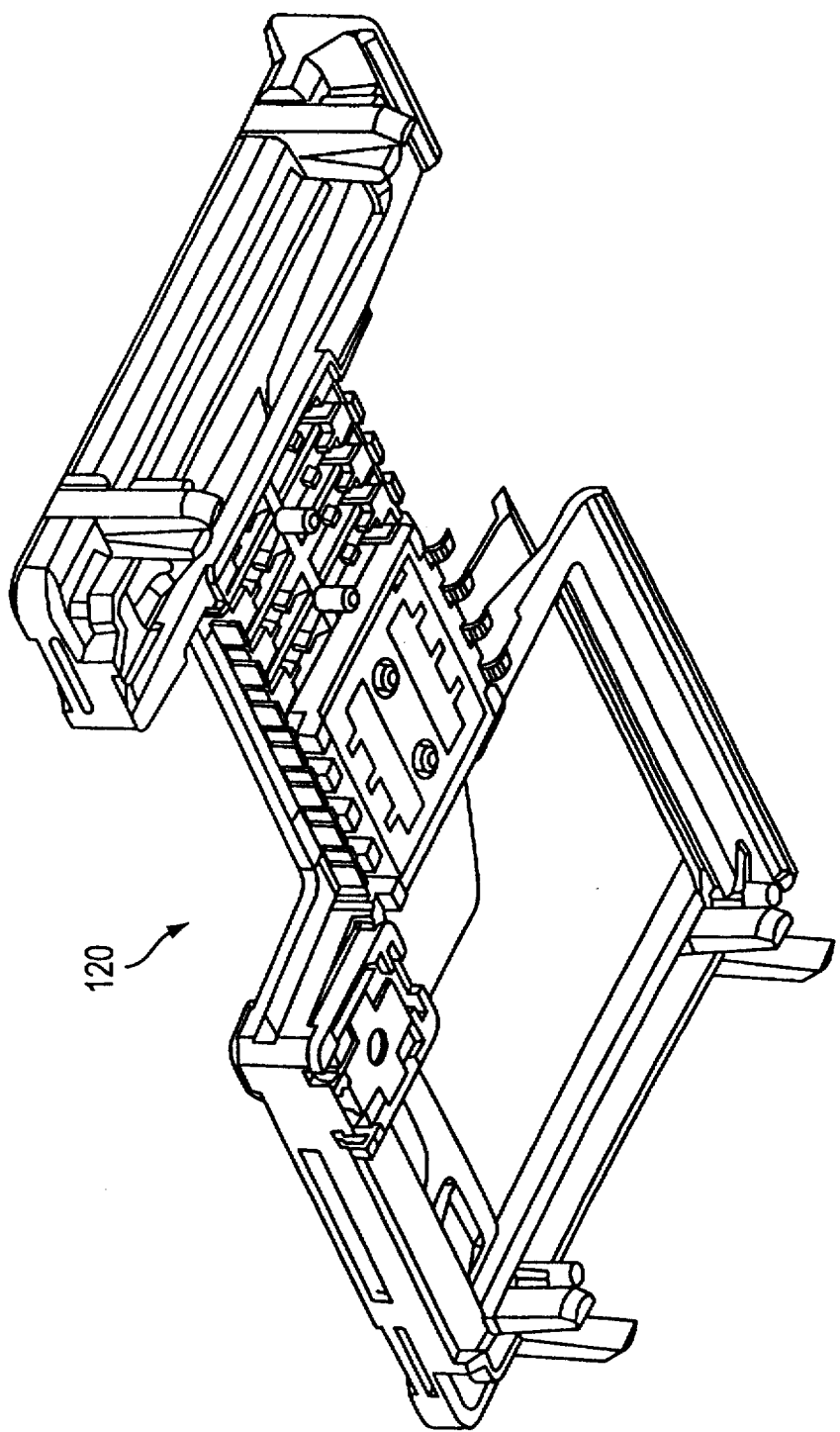
FIG. 11 is a bottom isometric view of the assembled case of FIG. 7.
Figure 12:
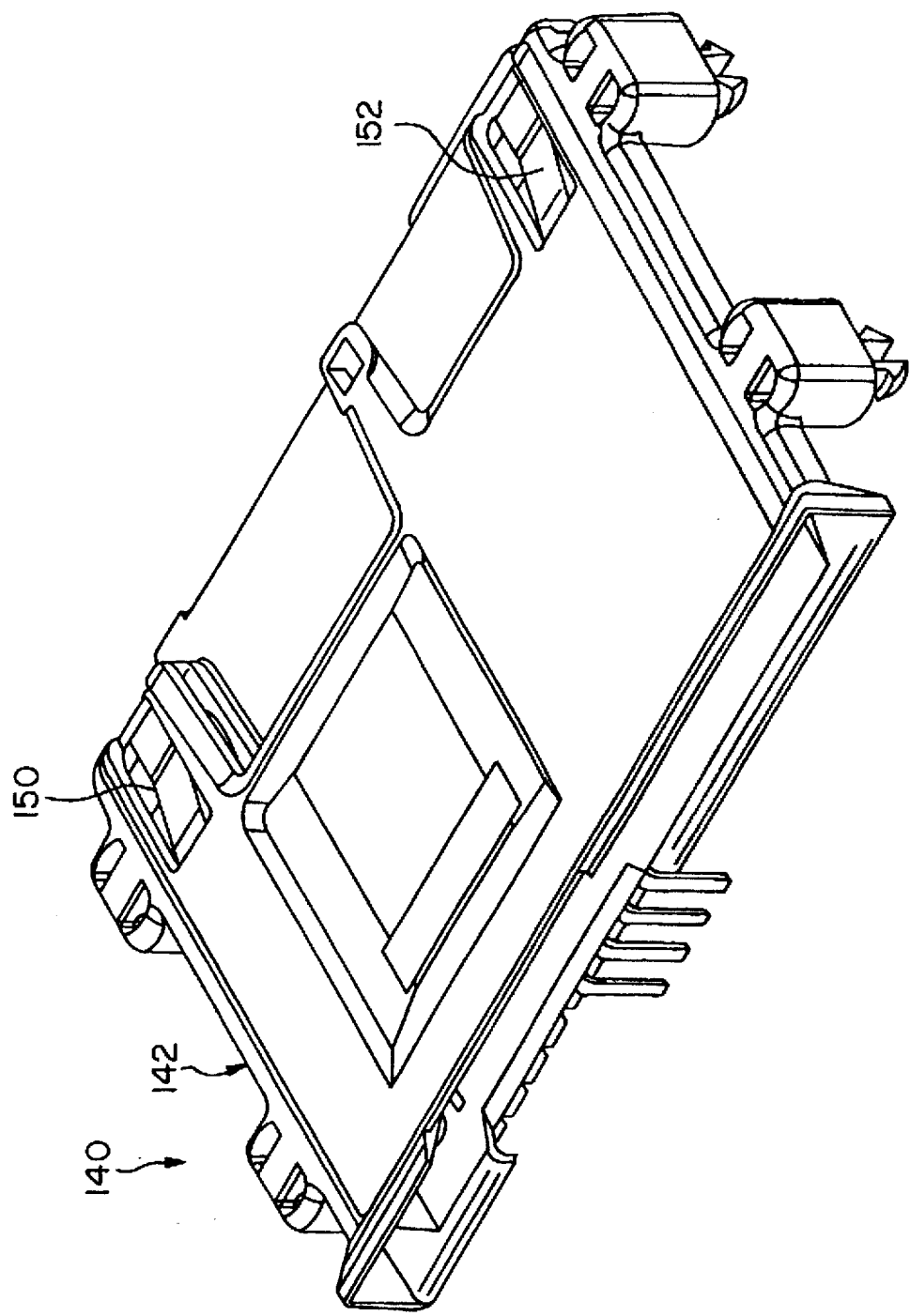
FIG. 12 is an isometric view of a case of still another embodiment of the invention.
Figure 13:
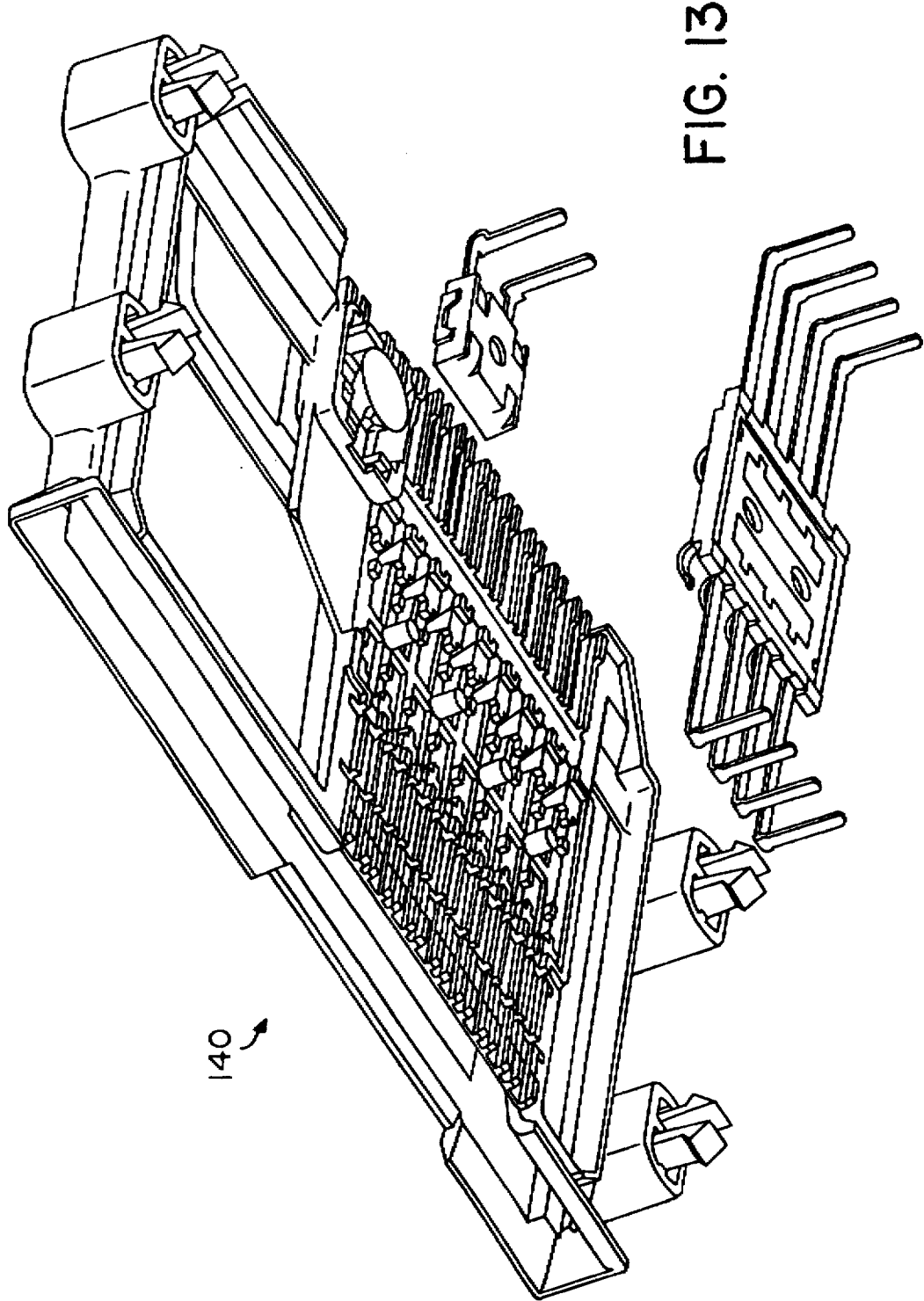
FIG. 13 is a bottom exploded view of the case of FIG. 12.
Figure 14:
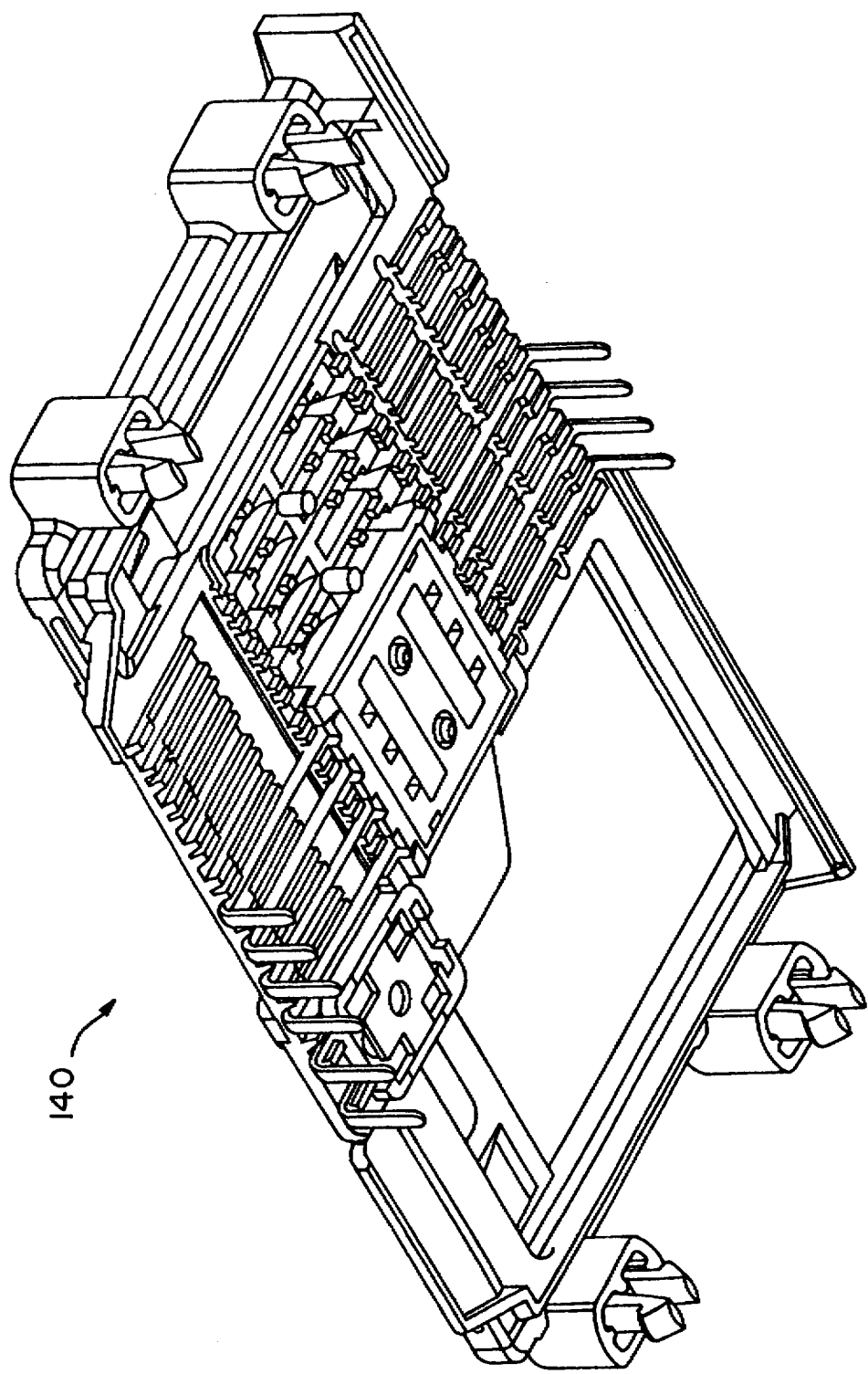
FIG. 14 is a bottom isometric view of the assembled case of FIG. 12.

FIGS. 7–11 illustrate a case 120 for receiving a card Cd, with the case being of a design similar to that of FIG. 1A, except that the figures show more details and a later design. The case includes a housing 122 which is a one piece molded part, that is molded with four boardlocks 124 for mounting on a circuit board. FIG. 10 shows the three parts of the case 120 including the housing 122, a connector 130, and a switch 132 (for detecting full card insertion). The connector 130 and switch 132 are standard components, while the housing 122 is custom designed for each card.

FIGS. 12–16 illustrate a case 140 with a housing 142 of a design similar to that of FIGS. 4–6, but with a central section as long as the side sections. It may be noted that the case 142 includes only two brakes 150, 152. As shown in FIG. 15, each brake such as 150 is in the form of a tab that has a rear end 160 that merges with the rest of an upper crosspiece 162. The brake has a middle portion 164 that extends at a downward-forward incline, and has with a lowermost front tab portion or front end 166. The front end 166 lies very close to the front end 168 of the card-receiving slot. As a result, where the slot length may be perhaps 35 mm, the brakes such as 150 engage and apply maximum braking force to the card only during perhaps the last 10% of its movement. By applying a maximum breaking force only during about 10% (i.e. no more than 15%) of card movement, the person who is inserting the card receives a tactile feedback indicating when the card is close to full insertion. Such a tactile feedback is valuable in indicating the last portion of card movement so the person will not press hard to further insert the card when the card reaches stops at the front end of the slot.

FIG. 16 shows the leading edge 34 of the card as it rides up a lower ramp 170 of the lower housing portion and deflects a brake 150 upwardly. FIG. 17 shows that the resistance to card movement, or displacement, increases sharply at 150×, as the card rides up the steep (at least 20° from the horizontal) ramp and rapidly deflects the brake 150. At 150Y, the brake is not deflected any further, but the brake applies moderate resistance. At 150Z, the leading edge of the card hits a stop 172.

Although terms such as "upper" and "lower" have been used to aid in the description of the invention as illustrated, the case can be used in any orientation with respect to Gravity.

Thus, the invention provides a card case for receiving an electronic card and contacting it, which can be constructed at moderate cost despite the need for cases to receive cards of a variety of sizes. This is accomplished by forming each case with a card receiver housing that is devoid of molded-in contacts, and by providing a separate, generally standard connector with its own frame and contacts mounted thereon. This usually allows the housing to be molded as a single unitary part. The connector can be mounted with its contact blades projecting up through slots in a lower crosspiece, or the connector frame can have an upper portion that lies in a large aperture in the lower crosspiece. The lower crosspiece can be formed with a central section of reduced length, to provide direct solder access to connector contact tails that do not extend far from the connector frame. This construction also lowers the amount of material and the weight, which can be further lowered by forming windows in at least the lower crosspiece.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A case for receiving an electronic card of predetermined width and thickness and that has a face with electrical card terminals and that has laterally spaced opposite card sides, comprising:

a receiver housing that forms a pair of laterally spaced slideways that closely slidably guide the card sides in forward longitudinal movement into said housing, and at least one plate-like crosspiece that connects said slideways;

a connector that includes a plastic molded connector frame and a plurality of contacts that each have contact mount parts fixed to said connector frame and that each have projecting card-engaging contact blades;

said receiver housing being a unitary molded part that includes said slideways and said crosspiece, with each slideway including a top wall and a bottom wall and a side wall and said connector is fixedly mounted on said crosspiece with said contact blades positioned to engage said card terminals as the card is slid forwardly into said housing.

2. The card case described in claim 1 wherein:

said crosspiece has left and right side sections that each lie adjacent to one of said slideways, and has a center section that connects said side sections and that holds said connector frame;

said slideways each have rear ends, and said middle section has a rear end spaced forwardly from said slideway rear ends, with said card having a laterally extending width of a plurality of centimeters and with said middle section spaced forwardly from said slideway rear ends by at least one-half centimeter.

3. The card case described in claim 1 including:

a circuit board lying under said crosspiece and halving conductive traces, with said receiver housing mounted on said circuit board; and wherein said contacts of said connector have surface mount solderable tails, with said connector frame having front and rear ends and said tails lying at said front and rear ends of said connector frame for soldering to said traces, with said tails being longitudinally spaced by a predetermined distance;

the longitudinal length of each of said slideways is at least about twice the length of said connector frame, and said crosspiece has a center section of reduced longitudinal length that is about equal to said longitudinal spacing of said front and rear tails, to provide direct access to said tails for soldering them to said traces.

4. The card case described in claim 1 wherein:

said crosspiece has left and right side sections that each lie adjacent to one of said slideways and a center section connecting said side section, with said connector frame being mounted on said center section;

each of said side sections has at least one vertically extending through aperture, with said apertures occupying at least 10% of the entire area within the perimeter of the crosspiece as seen in a plan view.

5. The card case described in claim 1 wherein:

said receiver housing includes upper and lower plate-like crosspiece members that each connects said slideways, with said lower crosspiece member forming said at least one plate-like crosspiece, with said crosspiece members being spaced to form a card-receiving slot between them, and with said crosspiece members and said slideways being a unitary one-piece molded part.

6. The card case described in claim 5 wherein:

said receiver housing has a front end forming at least one stop for abutting a card front end;

said upper crosspiece member has an integral brake tab with a rear end merging with the rest of the crosspiece member, said brake tab extending at a downward incline from its rear end and having a front end to press a fully inserted card down against said lower crosspiece during only about the last 10% of card movement into said housing.

7. The card case described in claim 1 wherein:

said upper crosspiece has a plurality of blade-passing vertical crosspiece slots for passing said contact blades, said connector frame is mounted under said crosspiece, and said contact blades project through and above said crosspiece slots.

8. The card case described in claim 7 wherein:

said crosspiece has a thin blade-locating wall beside each of said vertical slots, and each of said contact blades has a mounted end fixed to said connector frame and a free end lying under and pressing upwardly against one of said blade-locating walls.

9. The card case described in claim 1 wherein:

said crosspiece has a large frame-receiving aperture, and said connector frame has an upper portion lying in said frame-receiving aperture, said frame upper portion having a plurality of blade-passing slots, with each of said contact blades projecting through and above one of said slots.

10. A card case for mounting on a circuit board and for receiving an electronic card that has a card lower face with electrical card terminals and laterally-spaced opposite card side edges, comprising:

a plastic molded unitary receiver housing that has laterally spaced opposite sides forming slideways for slidably guiding the sides of said electronic card with said slideways each including walls for engaging the top and bottom and side edge of a card, and that has upper and lower plate-like crosspieces connecting said opposite sides of said housing with said crosspieces being vertically spaced to receive a card between them, and with said lower crosspiece having a center section, said receiver housing being mountable on said circuit board;

a connector that has a connector frame with an upper surface and a plurality of contacts that each has a contact mount part mounted on said frame, a tail for mounting on said circuit board, and a card terminal-engaging blade projecting above said frame upper surface;

said lower crosspiece has a center section with at least one vertical through hole therein, and said connector frame is fixedly mounted to said lower crosspiece with at least one of said contact blades projecting through said hole and with a blade portion lying above said lower crosspiece.

11. The card described in claim 10 wherein:

said center section of said lower crosspiece has a plurality of blade-passing vertical slots, including said hole, said connector frame is mounted under said lower crosspiece, with said contact blades project through and above said slots.

12. The card described in claim 11 wherein:

said lower crosspiece has a thin blade-locating wall beside each of said vertical slots, and each of said contact blades has a free end lying under and against one of said blade-locating walls.

13. The card described in claim 10 wherein:

said lower crosspiece has a large frame-receiving aperture that forms said hole, and said connector frame has an upper portion lying in said frame-receiving aperture, said frame upper portion having a plurality of blade-passing slots, with each of said contact blades projecting through and above one of said slots.

14. A card case for receiving an electronic card, comprising:

a card receiver housing that has laterally spaced opposite sides forming slideways for slidably guiding the sides of said electronic card in longitudinal movement forwardly into said housing and rearwardly out of said housing, said housing having upper and lower plate-like horizontally-extending crosspieces with at least one of them connecting said opposite sides of said housing, with said crosspieces being vertically spaced to form a card-receiving slot between them, and with said housing forming a stop that define a forward end of said card-receiving slot;

a first of said crosspieces has a brake tab with a rear end merging with the rest of said first crosspiece, and with a forward end, said brake tab having a tab portion extending at an incline to the horizontal to extend at least partially across the height of said card-receiving slot so said tab forward end resists card movement, with said tab forward end lying adjacent to, but slightly rearward of the forward end of said card-receiving slot to resist card forward movement only near full insertion of the card when a forward end of the card closely approaches said slot forward end.

15. The card case described in claim 14 wherein:

said lower plate-like crosspiece has a ramp that is positioned under said tab to suddenly increase resistance to card forward movement near full card insertion.

16. A method for constructing a card case for receiving an electronic card that has a face with electrical card terminals and that has laterally spaced opposite card sides, comprising:

molding a quantity of plastic into a one-piece housing with a card-receiving slot having an open rear end, and with integral laterally-spaced slideways for engaging the card sides and with integral upper and lower plate-like crosspieces connecting said slideways;

forming a connector with a plastic connector frame and a plurality of contacts, where each contact has a contact mount part fixed to said connector frame and a connector blade projecting above said connector frame;

fixedly mounting said connector on said lower crosspiece with said contact blades projecting upwardly into said card-receiving slot.

17. The method described in claim 16 wherein:

said step of molding said plastic into a housing includes forming said lower crosspiece with a plurality of blade-passing vertical slots;

said step of mounting said connector includes mounting said connector under said lower crosspiece, with said contact blades projecting upwardly through and above said slots.

18. The method described in claim 16 wherein:

said step of molding said plastic into a housing includes forming said lower crosspiece with a large frame-receiving aperture, and said step of forming a connector includes forming said connector frame with an upper frame portion about the size of said frame-receiving aperture and with a lower frame portion;

said step of mounting said connector includes mounting said lower frame portion under and against said lower crosspiece with said upper frame portion lying in said frame-receiving aperture.

* * * * *